United States Patent Office 2,889,326
Patented June 2, 1959

2,889,326

ACYL DERIVATIVES OF 5,6 DIHYDRO-BENZO[c]CINNOLINE

Rudolf Pfister and Franz Häfliger, Basel, Switzerland, assignors to Geigy Chemical Corporation, Ardsley, N.Y., a corporation of Delaware No Drawing. Application July 31, 1958
Serial No. 752,205

Claims priority, application Switzerland February 16, 1955

4 Claims. (Cl. 260—250)

The present invention is concerned with therapeutically valuable acyl derivatives of 5.6-dihydro-benzo[c]cinnoline and the substitution products thereof.

It has been found that N.N'-malonyl-dihydro-benzo [c]cinnolines of the general formula:

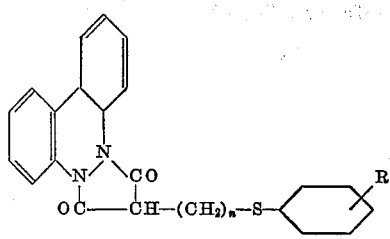

wherein:

R represents hydrogen, chlorine or a lower alkyl or alkoxy radical and $n$ represents a digit from 2–4, or the tautomeric forms thereof, have therapeutically valuable properties. In particular they have an antipyretic, antiphlogistic and uricosuric activity. They are useful especially for the treatment of rheumatic diseases and of gout. They may be administered per os, by injection or in the form of suppositories.

These new compounds can be produced by reacting a reactive functional derivative of a malonic acid of the general formula:

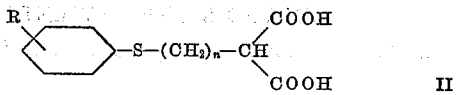

with 5.6-dihydro-benzo[c]cinnoline or with an N-monoacyl derivative thereof having an acyl radical which is easily split off, the reaction being performed in the presence of a condensing agent or an acid binding agent; or the malonic acid derivative can be reacted with a metal compound of such dihydrobenzocinnoline. In the above, as in all following formulae, R has the meaning given in Formula I. One method of performing the above process consists in condensing a malonic acid diester of the general formula:

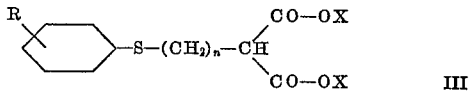

wherein X represents the radical of a hydroxyl compound, in particular a lower alkyl radical, with dihydrobenzocinnoline or with an N-monoacyl derivative thereof having an acyl radical which is easily split off, the condensation being performed preferably in the presence of an alkaline condensing agent; or a malonic acid derivative of the general formula:

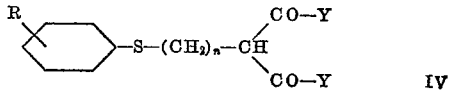

wherein Y represents chlorine, bromine or an acyloxy radical, is condensed with dihydrobenzocinnoline, preferably in the presence of an acid binding agent, or with a metal compound of dihydrobenzocinnoline.

Alkali metals or compounds thereof such as alcoholates, amides, or hydrides can be used as alkaline condensing agents in the first process above mentioned. The condensation is performed preferably in the presence of organic solvents such as, e.g. ethanol, butanol, benzene, toluene, xylene etc. and at a raised temperature, advantageously between 60 and 160° C., the alcohol which is liberated being continuously distilled off if desired.

In particular, tertiary organic bases such as pyridine or dimethyl aniline, triethyl and also tributyl amine in the presence or absence of additional organic solvents such as, e.g. diethyl or di-isopropyl ether or chloroform, are suitable acid binding agents for the second reaction mentioned. In this case, the ring is closed already at low temperatures, advantageously in the region of 0° C. In particular the N.N'-disodium, N.N'-dipotassium and N.N'-dilithium compounds are used as metal compounds of dihydrobenzocinnolines. Also N.N'-bis-bromomagnesium compounds for example can be used.

As reactive functional derivatives of malonic acids of the general Formula II, also malonic acid monoester halides or malonic acid monoester anhydrides of the general formula:

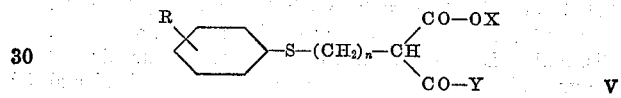

wherein X and Y have the meanings given above, can be used. These can be condensed in the cold in the presence of an acid binding agent with dihydrobenzocinnoline corresponding to the second process mentioned to form N-(α-carbalkoxy-acyl)-dihydrobenzocinnoline of the general formula:

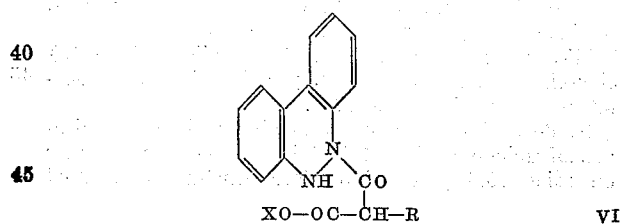

and converted in the second step corresponding to the first process mentioned by the action of alkaline condensing agents in the warm into the desired end products of the general Formula I.

Substituted malonic acid diesters of the general Formula III are known and many other compounds can be produced if desired by methods known per se. For example, the diethyl esters and dimethyl esters of the following monosubstituted malonic acids can be used as starting materials: phenylmercapto-ethyl, (γ-phenylmercapto-propyl), (δ-phenylmercapto-butyl), (o-chlorophenylmercapto - ethyl), (p - chlorophenyl - mercapto - ethyl), (p-methyl-phenylmercapto-ethyl), (p-methoxy-phenylmercapto-ethyl), (o-methoxy-phenylmercapto-ethyl), and (γ-[p-methoxy-phenylmercapto]-propyl)-malonic acids.

5.6-dihydro-benzo[c]cinnoline can be obtained for example by reduction of 2.2'-dinitro-diphenyl by means of sodium sulphide according to Ullmann and Dieterle, B, 37, 24 (1904), to form benzo[c]cinnoline-5-oxide and reduction of the latter by means of zinc dust in alkaline solution according to Duval, Bl. (4), 7, 487. The 2.2'-dinitro-diphenyl is obtained for example according to Niementowski, B, 34, 3327 (1901), from 2-nitrobenzene diazonium chloride by means of freshly precipitated copper. As 5.6-dihydro-benzo[c]cinnoline is very quickly oxidised in the air into the corresponding benzo[c]cinnoline, it is advantageous to add it to the reaction mixtures in the form of its hydrochloride. The base is then liberated by an excess of alkaline condensing agent and the condensation is performed in a nitrogen atmosphere.

The new N.N' - malonyl - dihydrobenzocinnolines are weakly coloured, crystalline substances which dissolve easily both in the usual organic solvents as well as, due to the presence of an acid hydrogen atom, probably in the tautomeric enol form, in diluted aqueous alkalies. Also the new compounds form salts with other inorganic as well as with organic bases.

The aqueous solutions of the alkali metal salts of the new compounds have also the property of acting as solubility promoters on pyrazole derivatives.

The following example further illustrates the production of the new compounds. Parts are given as parts by weight and their relationship to parts by volume is as that of grammes to cubic centimetres. The temperatures are in degrees centigrade.

*Example*

20 parts of zinc dust are added in portions to a mixture of 20 parts (0.1 mol) of benzo[c]cinnoline-N-oxide, 200 parts of benzene and 100 parts of 4-N caustic soda lye at 70–80°. After about 2 hours, the reaction mixture which is now pale yellow, is drawn off under suction in a nitrogen atmosphere, the caustic soda lye is separated and the benzene solution is distilled until no more water passes over. Then 29.6 parts (0.1 mol) of phenylmercapto-ethyl malonic acid diethyl ester (B.P.$_{0.004}$ 141°), and finally a sodium ethylate solution from 2.3 parts of sodium and 50 parts of alcohol are added. Distillation is then continued until most of the alcohol is removed. 50 parts of abs. xylene are then added and distillation is again continued for 12 hours at a bath temperature of 130–140°. 200 parts of ice water are then stirred in, the whole is shaken out several times with small portions of chloroform, the aqueous phase is made acid to Congo red paper and the precipitated substance is taken up in ethyl acetate. The ethyl acetate solution is washed with water, dried over sodium sulphate and the solvent is evaporated off. The crude N.N'-(phenylmercapto-ethyl malonyl)-dihydro-benzo[c]cinnoline which remains is recrystallised from ethyl acetate whereupon it melts at 127°.

N.N'-(p-chlorophenylmercapto-ethyl malonyl)-dihydrobenzo[c]cinnoline is obtained in an analogous manner on using 33.0 parts of p-chlorophenylmercapto - ethyl malonic acid diethyl ester (B.P.$_{0.05}$ 145°). After crystallisation from ethyl acetate, the product melts at 122°.

Also, on using 32.6 parts of p-methoxy-phenylmercapto-ethyl malonic acid diethyl ester (B.P.$_{0.02}$ 163°), N.N' - (p - methoxy - phenylmercapto - ethyl malonyl)-dihydro-benzo[c]cinnoline is obtained. It melts at 113° (from ethyl acetate).

Also, on using 31.0 parts of p-phenylmercapto-propyl malonic acid diethyl ester (B.P.$_{0.09}$ 156°), N.N' - (γ-phenylmercapto-propyl malonyl)-dihydro-benzo[c]cinnoline is obtained.

On using 32.4 parts of δ-phenylmercapto-butyl malonic acid diethyl ester (B.P.$_{0.09}$ 161°), N.N'-(δ-phenylmercapto-butyl malonyl)-dihydro-benzo[c]cinnoline is obtained, and on using 31.0 parts of p-methyl-phenylmercapto-ethyl malonic acid diethyl ester (B.P.$_{0.15}$ 158°), N.N' - (p - methyl - phenylmercapto - ethyl malonyl)-dihydro-benzo[c]cinnoline is obtained.

The present application is a continuation-in-part of copending application, Serial No. 564,868, filed February 13, 1956.

What we claim is:

1. An N.N'-(phenylmercapto-lower alkyl malonyl)-dihydro-benzo[c]cinnoline of the formula

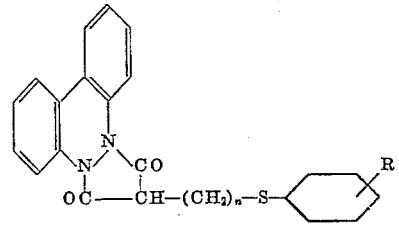

wherein R represents a member selected from the group consisting of hydrogen, chlorine, a lower alkyl and a lower alkoxy radical, and $n$ is a digit from 2 to 4 inclusive.

2. N.N' - (phenylmercapto - ethyl malonyl) - dihydro-benzo[c]cinnoline.

3. N.N'-(p-chlorophenylmercapto-ethyl malonyl)-dihydro-benzo[c]cinnoline.

4. N.N'-(p-methoxy-phenylmercapto-ethyl malonyl)-dihydro-benzo[c]cinnoline.

References Cited in the file of this patent
UNITED STATES PATENTS 2,778,829    Matter _____ Jan. 22, 1957